(12) United States Patent
Koning et al.

(10) Patent No.: US 7,977,423 B2
(45) Date of Patent: Jul. 12, 2011

(54) CARBON NANOTUBE REINFORCED POLYMER AND PROCESS FOR PREPARING THE SAME

(75) Inventors: Cornelis E. Koning, Brunssum (NL); Oren Regev, Eindhoven (NL); Joachim Loos, Nuenen (NL)

(73) Assignees: Stichting Dutch Polymer Institute, Eindhoven (NL); Ben-Gurion University of the Negev Research and Development Authority, Beer-Sheva (IL)

( * ) Notice: Subject to any disclaimer, the term of this patent is extended or adjusted under 35 U.S.C. 154(b) by 255 days.

(21) Appl. No.: 12/436,590

(22) Filed: May 6, 2009

(65) Prior Publication Data

US 2010/0072432 A1 Mar. 25, 2010

Related U.S. Application Data

(62) Division of application No. 10/545,315, filed as application No. PCT/NL2004/000109 on Feb. 12, 2004, now Pat. No. 7,569,637.

(30) Foreign Application Priority Data

Feb. 13, 2003 (WO) .................. PCT/NL2003/00108
Aug. 15, 2003 (WO) .................. PCT/NL2003/00584

(51) Int. Cl.
*C09B 67/00* (2006.01)
(52) U.S. Cl. ......... 524/502; 977/742; 977/750; 977/753
(58) Field of Classification Search .................. 524/502; 977/742, 750, 753
See application file for complete search history.

(56) References Cited

U.S. PATENT DOCUMENTS

| | | | |
|---|---|---|---|
| 6,265,466 B1 | 7/2001 | Glatkowski et al. | |
| 6,331,265 B1 | 12/2001 | Dupire et al. | |
| 2002/0172789 A1 | 11/2002 | Watson et al. | |
| 2004/0131859 A1* | 7/2004 | Yerushalmi-Rozen et al. ............................ 428/408 |

FOREIGN PATENT DOCUMENTS

WO  WO 02/076888 A1  10/2002

OTHER PUBLICATIONS

Dufresne et al. "Processing and characterization of carbon nanotube/polystyrene-Co-butyl acrylate) nanocomposites", Journal of Material Science, 37, (2002), p. 3915-3923.*
International Search Report.
A. Dufresne et al; "Processing and characterization of carbon nanotube/poly(styrene-co-butyl acrylate) nanocomposites"; Journal of Materials Science 37 (2002); pp. 3915-3923.
Bandyopadhyaya et al; "Stabilization of Individual Carbon Nanotubes in Aqueous Solutions"; Nano Letters 2002, vol. 2, No. 1, pp. 25-28.
Liu et al, Science 280 (1988) p. 1253.

* cited by examiner

*Primary Examiner* — Michael M Bernshteyn
(74) *Attorney, Agent, or Firm* — Nixon & Vanderhye P.C.

(57) ABSTRACT

Carbon nanotube reinforced polymers include a polymer and carbon nanotubes reinforcing the polymer. The carbon nanotube reinforced polymer exhibits a conductivity percolation threshold of less than $10^6$ Ω/cm at a carbon nanotube content of 1.5 wt. % and less. The polymer may be selected from a polyamide or a polystyrene based polymer. In certain embodiments, the carbon nanotube content is between 0.1 to 1.5 wt. %, and the reinforced polymer will have a percolation threshold at a carbon nanotube content of less than 0.5 wt. %.

7 Claims, 2 Drawing Sheets

Resistivity measurement of composite films containing SDS-dispersed SWNT in PS (open squares) and in poly(methyl methacrylate) (PMMA) (solid squares) matrix. GA-dispersed SWNT in PS (solid triangles). PS/SDS, PMMA/SDS = 30:1 w/w, PS/GA = 30:5 w/w.

CARBON NANOTUBE REINFORCED POLYMER AND PROCESS FOR PREPARING THE SAME

CROSS-REFERENCE TO RELATED APPLICATIONS

This application is a divisional of commonly owned U.S. application Ser. No. 10/545,315, filed Apr. 10, 2006, now U.S. Pat. No. 7,569,637, which in turn is the national phase application under 35 USC §371 of PCT/NL2004/000109 filed Feb. 12, 2004 which designated the U.S. and claims benefit of PCT/NL03/00108, dated Feb. 13, 2003 and PCT/NL03/00584, dated Aug. 15, 2003, the entire contents of each application being hereby incorporated by reference herein.

FIELD

The present invention relates to a process for the preparation of a carbon nanotube reinforced polymer.

BACKGROUND AND SUMMARY

In recent years, much effort has been put into the incorporation of carbon nanotubes in polymer matrices. The composites obtained are interesting materials, since they have enhanced electrical and mechanical properties at very low loading due to the specific nanotube characteristics, such as their high aspect ratio and electrical conductance. However, dispersion of carbon nanoutubes in highly viscous polymers is difficult and has often been attempted by functionalizing the nanotubes, leading to attractive interactions between the nanotubes and the polymer. In addition, dispersing exfoliated single nanotubes has been found to be a challenge, since nanotubes are highly bundled as a result of strong van-der-Waals interactions.

In general, materials can be divided into three groups regarding their electrical conductivity $\delta$: insulators ($\delta < 10^{-7}$ S/m), semi-conductors ($\delta = 10^{-7} - 10^5$ S/m) and conductors ($\delta > 10^5$ S/m). For polymers, typical conductivity values range from $10^{-15}$ S/m up to $10^{-12}$ S/m. Carbon fillers can have conductivities in the range of $10^4$ S/m up to $10^7$ S/m. In composites, the conductivity levels off to a slightly lower value than for the pure carbon species at higher filler concentration.

Carbon nanotube reinforced polymers are presently made by incorporating carbon nanotubes (CNTs), generally in the form of a bundle, in a polymer matrix. In order to obtain a homogeneous distribution of these CNTs, they are pretreated by either an ultrasonic treatment, or by a chemical modification process, aimed at improving the dispersability of the individual CNT in the polymer matrix. The incorporation of CNTs in such a polymeric matrix is for the enhancement of the stiffness as well as the conductivity of the polymer matrix material.

The reported procedures for obtaining homogeneous dispersions of CNTs in polymer matrices result in either breaking and lowering of the aspect ratio of the tubes (which is unfavourable for stiffness, strength, and conductivity of the composite), or in damaging the surface of the tubes (which lowers the stability and the conductivity of the tubes).

The process of the present invention offers a solution to this problem, as a result of which the CNTs remain substantially of the same length and aspect ratio. The reinforced polymer resulting from the process of the present invention has enhanced conductive and mechanical properties.

In J. Mater. Sci, 37, 2002, pages 3915-23, a process is described for the preparation of a poly(styrene/butyl acrylate) copolymer nano composite using CNTs as filler. This process uses multiwall CNTs (MWNT), suspended in an aqueous solution of sodium dodecyl sulphate (SDS), and a latex of the copolymer. An amount of at least 3 wt. % of the MWNT is needed to have a significant change in the electrical conductivity of the nanocomposite (the so-called percolation threshold).

DETAILED DESCRIPTION

Figure 1:
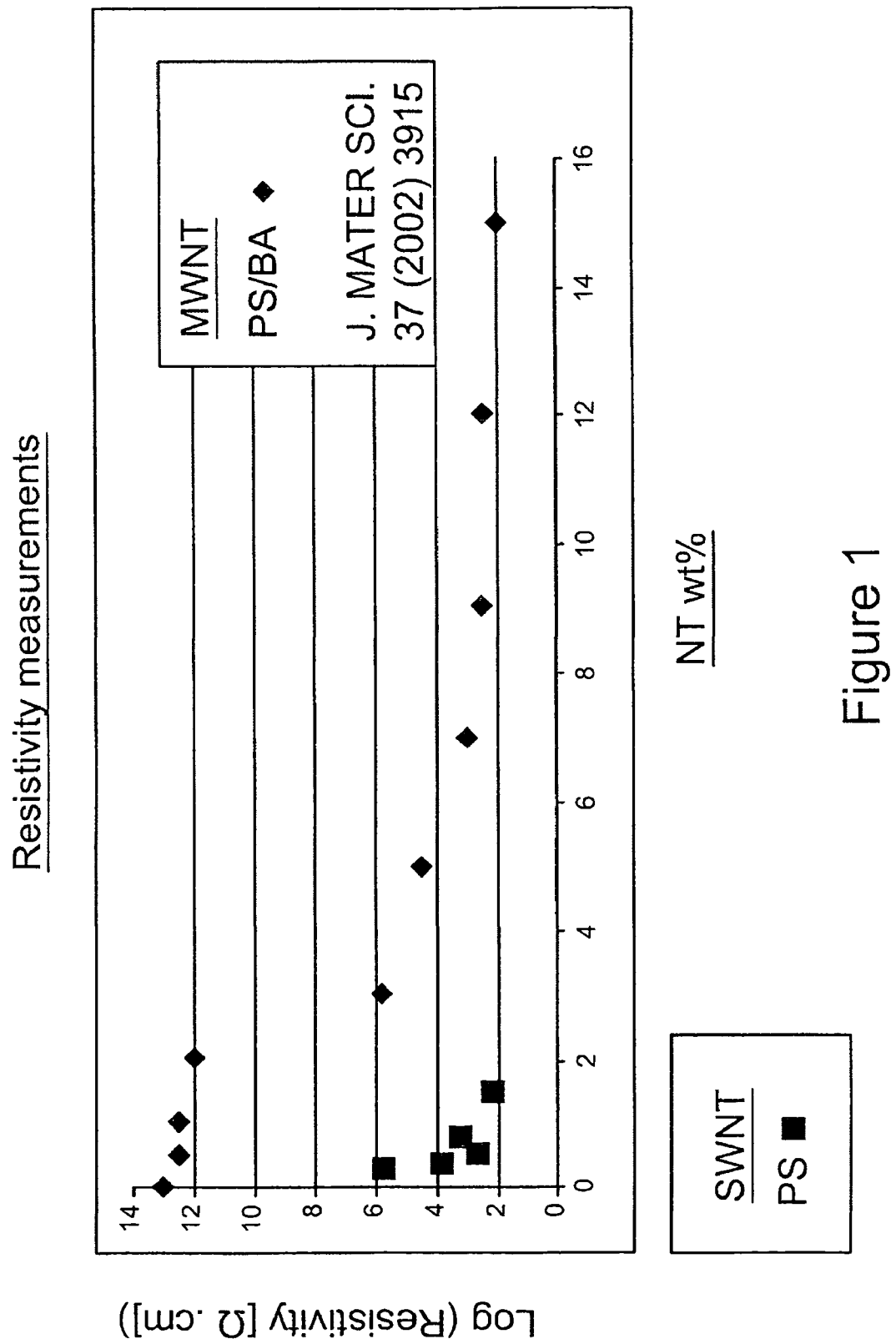
FIG. 1 is a graph of the resistivity measurements made in accordance with Example II/comparative experiment A below.

The process of the present invention provides a carbon nanotubes reinforced polymer having a percolation threshold at significantly lower loading of the CNT. It also provides a carbon nanotubes reinforced polymer based on other suspensions of the CNT, as well as other latexes or precursors thereof.

The process of the present invention comprises the following steps:

A) contacting carbon nanotubes in an aqueous medium with a water-soluble component, comprising either a water-soluble first polymer, or a water soluble surfactant;
B) mixing the resulting product from step A) with either an aqueous latex of a second polymer, or with (a) water-soluble precursor(s) of a second polymer;
C) removing water from the so obtained mixture;
D) heating the product from step C) to a temperature at which the second polymer flows or where the second polymer is formed from out of its precursor(s); and
E) processing and/or solidifying the product from step D) into a desired form. The steps of the process of the present invention will be separately discussed below.

Step A): preparing a slurry from carbon nanotubes in an aqueous medium. This method is described in WO 02/076888. In this publication a method is described for the exfoliation of single wall carbon nanotubes (SWNT), resulting in a stable aqueous product containing essentially single tubes. In this publication a water-soluble polymeric material is used for obtaining the exfoliated nanotubes, The contents of this publication are incorporated herein by reference.

In the process of the present invention the use of SWNTs is preferred, as it results in a much lower amount of the CNTs needed for obtaining the percolation threshold of the CNT-reinforced polymer, compared to the use of MWNTs. This lower loading also improves the mechanical and flow properties of the reinforced polymers.

As described in WO 02/076888, the water-soluble polymeric material should preferably be of a hydrophilic nature, either from natural or synthetic origin. In the process according to the present invention it is advantageous that the first polymer is Gum Arabicum.

In the present invention it has shown to be advantageous to improve the incorporation of the water-soluble polymeric material, when its hydrophilic nature is to be improved, to add (e.g. in step A) an electrolyte, like a water-soluble salt, like sodium-chloride. This improves the dispersability of the CNT in the matrix of the carbon nanotubes reinforced polymer.

In step A also a water-soluble surfactant can be used to effectively exfoliate the CNTs. Preference is given to a salt of a hydrocarbon sulphate or sulphonate, like sodiumdodecyl sulphate (SDS) or sodiumdodecyl sulphonate. Also preferred is a polyalkyleneoxide based surfactant.

The process of the present step A) is performed by contacting the essential ingredients (the water-soluble polymer or surfactant, and the carbon nanotubes) in any order in water or an aqueous solution. The resulting product can obtain up to 75 weight % of carbon nanotubes, coated with the said first polymer or surfactant. In this process, step A) the mass ratio of the first polymer or surfactant to the carbon nanotubes can range from 0.05 to 20.

The temperature at which this step A) is performed is not critical. Temperatures between room temperature and 75° C. are very well suited.

The residence time needed for an effective exfoliation of the carbon nanotubes can be easily determined by a man skilled in the art. Residence times below 1 hour have proven to be sufficient for that purpose.

Step B): The product resulting from step A) is brought into contact with either an aqueous latex of a second polymer, or with (a) water-soluble precursor(s) of a second polymer. This second polymer is the polymer which constitutes the matrix of the carbon nanotubes reinforced polymer, in which the carbon nanotubes are well-dispersed. Every aqueous polymer latex known to the skilled man can be used. Preference is given to a second polymer being selected from the group comprising polyacrylates, styrene-based (co-)polymers, butadiene-based (co-)polymers, polycarbonate, acrylonitrile-based (co-)polymers, (halogen-containing) polyolefins (like polyethylene or polypropylene), and polyamides.

Also (a) precursor(s) for such a second polymer can be used, as they are, or in the form of an aqueous solution thereof which can be converted to the second polymer via an emulsion polymerization. Preference can be given, for instance when a nylon is used as the second polymer, to the use in this step B) of either the monomer of said polymer (like ε-caprolactam when using nylon 6 as the final matrix material), or to the use of a salt of adipic acid and hexamethylene diamine, or diaminobutane, when nylon 6,6 or nylon 4,6 as the matrix material is aimed at. The skilled man is aware of the precursor(s) needed for such a second polymer. A preference is given to the use in this step B) of ((a) precursor(s) of) a polyamide or a polystyrene based polymer.

The temperature of this step B) generally lies between 10 and 150° C., The pressure is generally atmospheric, but may be increased in order to accommodate for processability in this step B) or in the following step C). The residence time for this step B) is not critical, and generally does not exceed 1 hour.

Although both thermoset polymers as well as thermoplastic polymers can be used as the matrix of the CNT reinforced polymer, the preference is given to the use of a (semi-) crystalline or amorphous thermoplastic polymer.

Step C): the mixture obtained in process step B), according to the present invention, is treated to remove (substantially all of the) water. There are different physical methods available to the skilled man to achieve this removal. Out of these methods, a preference is for performing step C) by means of evaporation, freeze-drying, or flash-drying.

Step D): is intended to realize a homogeneous dispersion of the CNTs in the second polymer. When in the preceeding steps use is made of (a) precursor(s) for this second polymer, this step D) is also intended to form the second polymer from this/these precursor(s). In the case that the second polymer is a thermoplastic polymer, the temperature in this step D is chosen such that it is 10-100° C. above the melting point (in case of a (semi-)crystalline second polymer), or above the glass point (in case of an amorphous second polymer). In the case that the second polymer is a thermoset polymer, the temperature in this step D) is chosen such, that this second polymer can be formed from its precursor(s), during which formation also step E) of the process of the present invention is applied.

In all cases, the man skilled in the art is aware of the process conditions under which this step D) is to be performed, depending on the nature of the second polymer.

Step E): of the process of the present invention is the processing and/or solidification of the product of step D) in a desired form. This step E) can be a molding step, a pelletizing step, an injection or compression molding step, or any known step to form a solidified polymer object.

The process of the present invention results in a CNT reinforced polymer, wherein the properties of the CNTs used are retained: the CNTs are hardly or not damaged, as a result of which they retain their original length as well as their original aspect ratio (AR) (ratio of length to diameter of the CNTs). The CNTs are essentially individually dispersed in the polymer matrix. The polymer therefore has improved stiffness as well as better conductivity properties.

The invention also relates to a carbon nanotube reinforced polymer, obtainable by the process of the present invention. With the (process of the) present invention polymer composites are obtainable having a conductivity percolation threshold at or below 3 wt. % of CNT. In particular, the process of the present invention results in a product that has a resistivity of less than $10^6$ Ω/cm at a carbon nanotube content of less than 3 wt. %, preferably 1.5 wt. % and less, more preferably between 0.1 to 1.5wt. %. In the art such a resistivity is only achieved at much higher loadings of the CNT, as can be seen from the article in J. Mater. Sci (supra).

The present invention therefore also relates to a carbon nanotubes reinforced polymer having a Relative Size Dimension (RSD) of the nanotubes incorporated therein of between 0.85 and 1.0, wherein the RSD is the ratio between the AR of the nanotubes in the reinforced polymer, and the AR of the virgin nanotubes (the CNTs used as starting material in the process of the present invention). More pronounced, the CNT reinforced polymer of the present invention has an RSD of at least 0.9.

The reinforced polymer of the present invention can be used for several applications in which the improved stiffness and conductivity properties can be exploited, Reference can be given to shielding applications (like electromagnetic interference shielding); high modulus conducting body panels for the automotive industry with a better surface appearance than glass fibre filled polymers; nano-electric devices (such as thin-film transitors), and others.

The invention is illustrated by the following non-limiting Examples and comparative experiment.

EXAMPLE I

Materials and Techniques

Materials: CNT–AP grade (Carbolex) (a SWNT), and Gum Arabicum, (GA) (Aldrich) were used as received.

An aqueous product of CNT+GA was prepared according to the teachings of WO 02/076888. GA was dissolved in water at room temperature to form solutions of 0.5 wt % to 15 wt %. A powder of as-produced single wall nanotubes (e.g. Carbolex AP grade) which contains a bundled network of ropes, was sonicated at very mild conditions (50 W, 43 KHz) for 15-20 minutes in the polymeric solutions (of concentrations between 0.2 wt % to 3 wt %). A black, homogeneous ink-like product was obtained, and mixed with a polystyrene (PS) latex (having a weight averaged molecular weight of 400 kg/mol).

The mixture was then freeze dried (Christ alpha 2-4) overnight and the dry powder was compression molded at 160° C. for 4 minutes at 10 MPa (after 4 circles of degassing).

Cryo-Transmission Electron Microscopy (cryo-TEM) was used to study the properties of the CNT-latex composition. Cryo-TEM is a particularly suitable technique for the direct visualization of aggregates ranging in size from about 5-10 nm to 1 micron. The sample is prepared using a newly developed vitrification robot—Vitrobot—in which the relative humidity is kept close to saturation to prevent water evaporation from the sample. A 3 microliter drop of the solution was put on a carbon-coated lacey substrate supported by a TEM 300 mesh copper grid (Ted Pella). After automatic blotting with filter paper, in order to create a thin liquid film over the grid, the grid was rapidly plunged into liquid ethane at its melting temperature, and a vitrified film was obtained. The vitrified specimen was then transferred under a liquid nitrogen environment to a cryo-holder (model 626, Gatan Inc., Warrendale, Pa.) into the electron microscope, Tecnai 20—Sphera (FEI), operating at 200 kV with a nominal underfocus of 2-4 micrometer. The working temperature was kept below −175° C., and the images were recorded on a Gatan 794 MultiScan digital camera and processed with a Digital Micrograph 3.6.

Conductivity Measurements

Room temperature electrical conductivity measurements were carried out using a standard 2 points configuration DC-Conductivity Keithly Electrometer.

Results and Discussion

Cryo-TEM

The latexes were imaged, and proved to be almost monodisperse, as complemented by static light scattering measurements.

The most important parameter to optimize, both for conductivity and mechanical properties of the film, is the strength of the interaction between the CNT and the matrix. In the present invention, since the individual CNT is in contact first with the GA, both properties are enhanced.

Another result is the film homogeneity after compression molding: the distribution of the CNTs in the film was found to be visually homogeneous, contrary to a film based on a non or less exfoliated bundle of CNTs.

When too much GA is used the film becomes brittle. The same effect is found when low latex content samples are prepared. However when low GA contents were used the solubility and exfoliation of the CNT bundles was limited. Depending on the type of water-soluble first polymer or water-soluble surfactant, the type of aqueous latex, the ranges at which these effects occur differ. The skilled man can determine the effective boundaries.

EXAMPLE II

Comparative Experiment A

The product of Example I was used for resistivity measurements; the results were compared with the results given in J. Mater. Sci (supra), in which MWNTs were used. The results of this comparison are given in FIG. 1.

From FIG. 1 it can be seen that the use of SWNTs reduces the conductivity percolation threshold significantly.

EXAMPLES III-V

Figure 2:
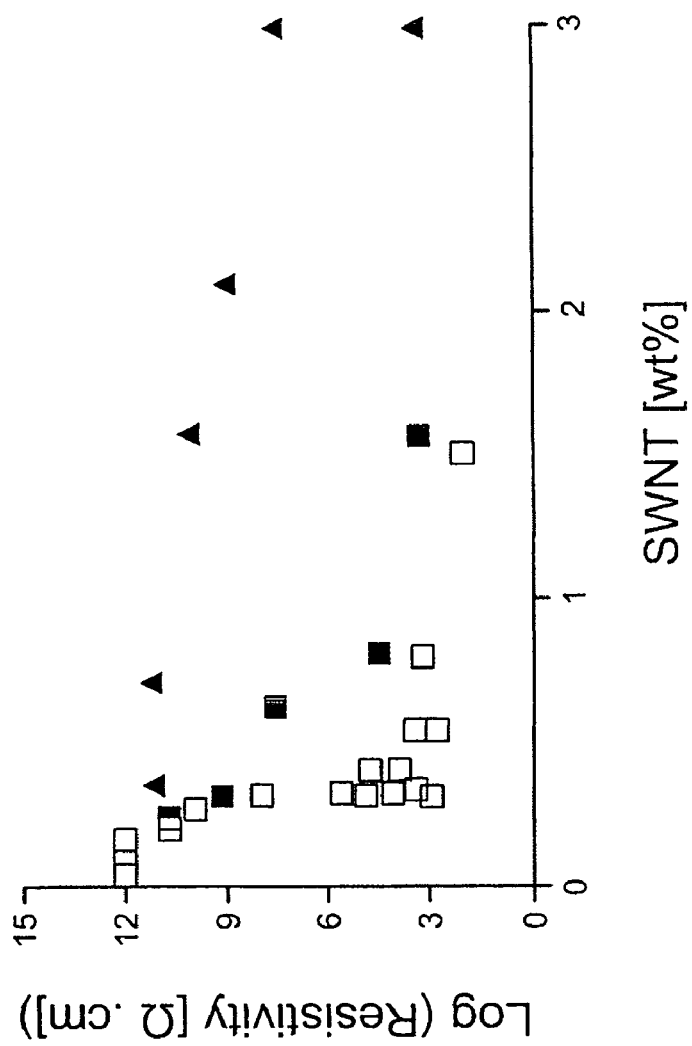
FIG. 2 is a graph of the resistivity measurements made in accordance with Examples III-V below.

Example I was repeated, but now using an aqueous dispersion having 1 wt. % SWNT and 1% SDS (resulting in a 1:1 wt. ratio between the SWNT and the SDS). In FIG. 2 the results of the resistivity measurements are given, using polystyrene (PS) as the matrix (Example III); using polymethyl methacrylate (PMMA) as the matrix (Example IV), in comparison with the results obtained when using GA. In Example V 0.5 wt. % of NaCl was added to the GA-dispersed SWNT/latex solution.

EXAMPLES VI-X

In these Examples, the synthesis as well as study of the electrical properties of composites consisting of individual single-wall, exfoliated carbon nanotubes in a highly viscous polyethylene (PE) matrix is reported. Both nanotubes and PE are dispersed in an aqueous solution. The uniqueness of the method is by employing latex technology for the dispersion of the PE. No nanotube functionalization was necessary, since attractive forces between the nanotubes and the polymer chains are not required. An environmental advantage of this process is that the SWNT-solution as well as the PE latex are aqueous solutions.

Ethylene emulsion polymerization technology was used to obtain stable PE latices with a solid content of around 2-3 wt % and a particle size of approximately 300 nm; stable aqueous SWNT/PE mixtures were achieved, which were suitable for freeze drying. No precipitation of PE latex particles or nanotubes was observed.

Compressed ethylene was purchased from Air Liquide and used as received. Sodium dodecylsulfate (SDS) was obtained from Merck. CNT-AP grade carbon nanotubes, as in Example I were used. A neutral nickel catalyst was used to catalyse the emulsion polymerization of ethylene.

The preparation was performed in dried vessels under argon, all solvents were degassed. A previously synthesised neutral nickel (II) catalyst complex was dissolved in 5 ml of acetone. SDS was dissolved in 95 ml of water. Both solutions were added to a mechanically stirred polymerization reactor, which was subsequently put under ethylene pressure (4 MPa). Polymerization took place during 2 hours. The resulting latex was poured through a Schleicher & Schuell paper filter (589 black ribbon).

The latex particle size distribution was determined by means of laser diffraction particle size analysis, using a Beckman Coulter LS 230 small volume optical module.

The latex solid content was determined by evaporating the water and acetone, resulting in precipitated polyethylene, which was subsequently weighed.

A 1 wt % solution of sodium dodecylsulfate (SDS) in water was prepared, which was subsequently used to make a 1 wt % SWNT solution. This solution was sonicated (during 15 minutes at 20 W) and centrifuged at 4000 rpm for 20 minutes. The solution is then decanted.

The PE latex was mixed with different amounts of SWNT solution, resulting in composites containing between 0.1 and 1.5 wt % of carbon nanotubes. The mixtures were freeze dried during two days to remove the water and acetone. Grey composite powders remained, which were compression moulded at 160° C. and 10 MPa between poly(ethylene terephthalate) sheets using a Collin Presse 300G. The obtained black films were approximately 0.1 mm thick.

On the films, contact lines were drawn with graphite conductive adhesive on isopropanol base (Electron Microscopy Sciences), after which electrical resistivity was determined using a Keithley 237-6217A set-up.

Cryogenic Transmission Electron Microscopy study was conducted on the PE latex and of a mixture of PE latex with a SWNT solution, as in Example I.

Latex particle size and solid content were determined for the different lattices. Due to the poor solubility of ethylene in water, the polymer contents of the emulsions were low. Table 1 shows the data obtained.

TABLE 1

Latex characteristics

| Example | Average particle size [nm] | Solid content [wt %] |
|---------|---------------------------|----------------------|
| VI | 300 | 1.85 |
| VII | 360 | 2.53 |
| VIII | 300 | 2.26 |
| IX | 270 | 1.80 |
| X | 300 | 2.15 |

Cryo-TEM images were made of the PE latex, showing non-spherical PE particles with diameters up to ~400 nm, which corresponds with laser diffraction results. The anisotropicity of the particles, compared with classical polystyrene emulsion polymerization, indicates that the crystallization rate is faster than the PE particle growth.

Cryo-TEM images were also obtained of mixtures of PE latex and SWNT solution. No repulsion between the PE particles and the SWNT was observed, indicating that the exfoliated tubes were well dispersed throughout the PE latex/SWNT solution mixture.

Homogeneous composite films were obtained after freeze-drying and compression molding. The percolation threshold was lower than 0.5 wt % SWNT in PE.

We claim:

1. Carbon nanotube reinforced polymer comprising a polymer and carbon nanotubes reinforcing the polymer, the carbon nanotube reinforced polymer having a conductivity percolation threshold of less than $10^6$ Ω/cm at a carbon nanotube content of 1.5 wt. % and less, wherein the polymer is selected from a polyamide or a polystyrene based polymer.

2. Carbon nanotube reinforced polymer according to claim 1, wherein the carbon nanotube content is between 0.1 to 1.5 wt. %.

3. Carbon nanotube reinforced polymer according to claim 1 having a conductivity percolation threshold of less than $10^6$ Ω/cm at a carbon nanotube content of less than 0.5 wt. %.

4. Carbon nanotube reinforced polymer, comprising a polymer and carbon nanotubes reinforcing the polymer, the carbon nanotube reinforced polymer having a Relative Size Dimension (RSD) of between 0.85 and 1.0, wherein the RSD is the ratio between the aspect ratio of the carbon nanotubes in the carbon nanotube reinforced polymer, and the aspect ratio of the virgin nanotubes, and wherein the carbon nanotube reinforced polymer product has a conductivity percolation threshold of less than $10^6$ Ω/cm at a carbon nanotube content of 1.5 wt. % and less, wherein the polymer is selected from a polyamide or a polystyrene based polymer.

5. Carbon nanotube reinforced polymer according to claim 4, wherein the RSD is at least 0.9.

6. Carbon nanotube reinforced polymer according to claim 4, wherein the carbon nanotube content is between 0.1 to 1.5 wt. %.

7. Carbon nanotube reinforced polymer according to claim 4 having a conductivity percolation threshold of less than $10^6$ Ω/cm at a carbon nanotube content of less than 0.5 wt. %.

* * * * *